(12) United States Patent
Sankrithi et al.

(10) Patent No.: US 10,800,525 B2
(45) Date of Patent: Oct. 13, 2020

(54) EFFICIENT LOW CARBON EMISSION AIRPLANE INTEGRATING JET FUEL AND CRYOGENIC FUEL SYSTEMS

(71) Applicant: The Boeing Company, Chicago, IL (US)

(72) Inventors: Mithra M. K. V. Sankrithi, Lake Forest Park, WA (US); Arvin Shajanian, Seattle, WA (US); Sergey D. Barmichev, Kirkland, WA (US); Victor Ken Stuhr, Seattle, WA (US); Joshua M. Kusnitz, Seattle, WA (US); Ismail Robbana, Seattle, WA (US)

(73) Assignee: The Boeing Company, Chicago, IL (US)

( * ) Notice: Subject to any disclaimer, the term of this patent is extended or adjusted under 35 U.S.C. 154(b) by 701 days.

(21) Appl. No.: 13/897,452

(22) Filed: May 20, 2013

(65) Prior Publication Data

US 2014/0339367 A1    Nov. 20, 2014

(51) Int. Cl.
*B64D 37/06* (2006.01)
*B64C 39/04* (2006.01)
(Continued)

(52) U.S. Cl.
CPC .............. *B64C 39/04* (2013.01); *B64C 30/00* (2013.01); *B64C 39/00* (2013.01); *B64D 37/04* (2013.01);
(Continued)

(58) Field of Classification Search
CPC ...... B64D 37/30; B64D 37/02; B64D 37/005; B64D 37/04; B64D 37/00; B64D 37/06;
(Continued)

(56) References Cited

U.S. PATENT DOCUMENTS 3,055,620 A * 9/1962 Weiland ................ B64C 1/1415
244/135 A
3,419,233 A * 12/1968 Wotton .................. B64D 37/14
244/135 R
(Continued)

FOREIGN PATENT DOCUMENTS

WO    WO2012045029 A1    4/2012
WO    WO2012045035 A2    4/2012

OTHER PUBLICATIONS

Prentex Alloy Fabricators, Inc., http://www.prentex.com/insulated. php.*
(Continued)

*Primary Examiner* — Christopher D Hutchens
(74) *Attorney, Agent, or Firm* — McDonnell Boehnen Hulbert & Berghoff LLP

(57) ABSTRACT

A hybrid fuel airplane and methods are presented. A cryogenic fuel is transferred to an airplane propulsor from an airplane fuel system comprising a cryogenic fuel tank and a jet fuel tank. The cryogenic fuel tank conforms to an outer mold line and carries a cryogenic fuel, and is located in a portion of the airplane body while not extending beyond the outer mold line. The jet fuel tank carries a jet fuel and is located in an airplane wing, or an airplane body, or both. A dynamic aircraft load is born on the cryogenic fuel tank, and the airplane propulsor is operated using the cryogenic fuel to generate thrust for the hybrid fuel airplane. An aerodynamic lift is generated using the airplane wing coupled to the airplane body.

19 Claims, 12 Drawing Sheets

(51) Int. Cl.
  *B64D 37/30* (2006.01)
  *B64D 37/04* (2006.01)
  *F02C 3/20* (2006.01)
  *B64C 30/00* (2006.01)
  *B64C 39/00* (2006.01)
  *B64C 1/00* (2006.01)

(52) U.S. Cl.
  CPC ............... *B64D 37/30* (2013.01); *F02C 3/20* (2013.01); *B64C 2001/0027* (2013.01); *Y10T 29/49826* (2015.01)

(58) Field of Classification Search
  CPC .. B64D 37/08; F02C 3/20; B64C 3/34; B64C 27/025; B64C 27/026; B64C 27/14
  See application file for complete search history.

(56) References Cited

U.S. PATENT DOCUMENTS

| | | | |
|---|---|---|---|
| 4,448,372 A * | 5/1984 | Larson | B64C 1/26 244/117 R |
| 5,088,661 A * | 2/1992 | Whitener | B64C 1/061 244/100 R |
| 5,408,825 A | 4/1995 | Foss et al. | |
| 6,382,556 B1 * | 5/2002 | Pham | B64C 27/28 244/6 |
| 7,234,667 B1 * | 6/2007 | Talmage, Jr. | B64C 1/00 244/120 |
| 8,523,105 B2 * | 9/2013 | Buchheit | B64D 41/00 244/117 R |
| 2003/0230671 A1 * | 12/2003 | Dunn | 244/53 R |
| 2004/0129836 A1 * | 7/2004 | Seidel | 244/120 |
| 2004/0245382 A1 * | 12/2004 | Nozaki | 244/53 R |
| 2005/0051666 A1 * | 3/2005 | Lee | B64C 30/00 244/10 |
| 2005/0178911 A1 * | 8/2005 | Armand | 244/119 |
| 2005/0230554 A1 * | 10/2005 | Schoene | 244/135 R |
| 2008/0006743 A1 * | 1/2008 | Miller et al. | 244/53 R |
| 2008/0230654 A1 | 9/2008 | Velicki et al. | |
| 2010/0044515 A1 * | 2/2010 | Neto | G01M 1/127 244/135 C |
| 2011/0101166 A1 | 5/2011 | Schwarze et al. | |
| 2011/0226906 A1 * | 9/2011 | Spottiswoode | B64C 17/10 244/135 C |
| 2012/0248251 A1 * | 10/2012 | Tichborne | G01M 3/18 244/135 R |
| 2014/0026597 A1 * | 1/2014 | Epstein et al. | 62/48.2 |
| 2014/0104732 A1 * | 4/2014 | Schult | H01H 83/02 361/42 |
| 2015/0040986 A1 * | 2/2015 | Tichborne | A62C 3/08 137/1 |
| 2015/0064585 A1 * | 3/2015 | Hyde et al. | 429/421 |
| 2015/0069184 A1 * | 3/2015 | Barmichev et al. | 244/135 R |
| 2016/0375985 A1 * | 12/2016 | Ribarov | B64D 37/04 244/135 C |

OTHER PUBLICATIONS

Marty K. Bradley and Christopher K. Droney, "Subsonic Ultra Green Aircraft Research Phase II: N∝Advanced Concept Development", Boeing Research and Technology, Huntington Beach, California, NASA/CR-2012-217556.

PCT/US2014/032318—International Search Report and Written Opinion dated Dec. 15, 2014 filed on the basis of the subject U.S. pending application.

Yefim Gordon, Bill Gunston: "Soviet X-Planes", Midland Publishing, Leicester, England, Jan. 1, 2000 (Jan. 1, 2000) XP055102363, ISBN: 1857800990 pp. 201-202.

Form PCT/IB/373, International Preliminary Report on Patentability dated Nov. 24, 2015.

* cited by examiner

EFFICIENT LOW CARBON EMISSION AIRPLANE INTEGRATING JET FUEL AND CRYOGENIC FUEL SYSTEMS

FIELD

Configurations of the present disclosure relate generally to fuel systems. More particularly, configurations of the present disclosure relate to aircraft fuel systems.

BACKGROUND

In the art of commercial airplanes, it is highly desirable to design airplanes with propulsion systems and fuel systems that yield reduced fuel burn per seat-kilometer and reduced carbon emission per seat-kilometer, that are representative metrics of airplane fuel efficiency, carbon dioxide emissions and carbon footprint. These considerations become even more important in economic scenarios with increased fuel cost (which motivate step-change technologies to reduce fuel consumption per passenger kilometer) and environmental scenarios where climate change effects take on increased importance and urgency.

The vast majority of modern commercial airplanes use propulsion systems that have gas turbine (Brayton cycle) core engines that drive ducted or unducted fans or rotors. Examples include turbofan engines, geared turbofan engines, ultra high bypass-ratio (UHB) engines, turbo-prop engines, and open fan or open rotor engines. The gas turbine core engines use "jet fuel" which can comprise one or more of kerosene type fuels, Jet-A, Jet A-1, JP-4, JP-5, JP-7, JP-8, JP-10, other jet fuels, biojet fuels and synfuels.

Cyrogenic fuels can offer low emissions, low cost, and high energy density per unit mass of fuel. Some experimental aircraft have been flown with cooled fuels or cryofuels such as cryo-hydrogen (liquid hydrogen) or cryo-methane fuel, but these have suffered from substantial drag penalties associated with large aircraft configuration blisters to accommodate the large volume cryofuel tanks. The large volume of the cryofuel tanks are needed because cryofuels typically have a significantly lower volumetric energy density (e.g., megajoules per liter or MJ/L) than current jet fuels.

SUMMARY

A hybrid fuel airplane and methods are presented. A cryogenic fuel is transferred to an airplane propulsor from an airplane fuel system comprising: a cryogenic fuel tank and a jet fuel tank. The cryogenic fuel tank conforms to an outer mold line of an airplane body and carries a cryogenic fuel, and is located in a portion of the airplane body while not extending beyond the outer mold line. The jet fuel tank carries jet fuel and is located in an airplane wing. A dynamic aircraft load is born on the cryogenic fuel tank, and the airplane propulsor is operated using the cryogenic fuel to generate thrust for the hybrid fuel airplane. An aerodynamic lift is generated using the airplane wing coupled to the airplane body.

In this manner, configurations of the disclosure provide an efficient low carbon emission airplane integrating jet fuel and cryofuel systems.

In a configuration, a hybrid fuel airplane comprises an airplane body, an airplane wing, an airplane propulsor, and an airplane fuel system. The airplane body conforms to an outer mold line, and the airplane wing is coupled to the airplane body and generates aerodynamic lift. The airplane propulsor generates thrust, and the airplane fuel system carries fuel usable by the airplane propulsor. The airplane fuel system comprises at least one cryogenic fuel tank that conforms to the outer mold line, bears a dynamic aircraft load, and carries a cryogenic fuel. The cryogenic fuel tank is located in a portion of the airplane body while not extending beyond the outer mold line. The airplane fuel system further comprises at least one jet fuel tank which carries jet fuel and is located in the airplane wing, or the airplane body, or both.

In another configuration, a method for configuring a hybrid fuel airplane configures an airplane body defined by an outer mold line, and configures a payload area within the airplane body. The method further couples an airplane wing that generates aerodynamic lift to the airplane body, and couples an airplane propulsor that generates thrust to the airplane body, or the airplane wing, or both. The method further configures an airplane fuel system to carry fuel usable by the airplane propulsor, and configures at least one cryogenic fuel tank to conform to the outer mold line and carry a cryogenic fuel while bearing a dynamic aircraft load. The method further positions the cryogenic fuel tank in a portion of the airplane body while not extending beyond the outer mold line, and positions a jet fuel tank in the airplane wing.

In a further configuration, a method for operating a hybrid fuel airplane comprising an airplane body defined by an outer mold line, transfers a cryogenic fuel to an airplane propulsor from an airplane fuel system. The airplane fuel system comprises: at least one cryogenic fuel tank configured to conform to the outer mold line, and configured to carry a cryogenic fuel, and located in a portion of the airplane body while not extending beyond the outer mold line, and a jet fuel tank configured to carry jet fuel and located in an airplane wing, or the airplane body, or both. The method further bears a dynamic aircraft load on the cryogenic fuel tank, and operates the airplane propulsor using the cryogenic fuel to generate thrust for the hybrid fuel airplane. The method further generates aerodynamic lift using the airplane wing coupled to the airplane body.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of configurations of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
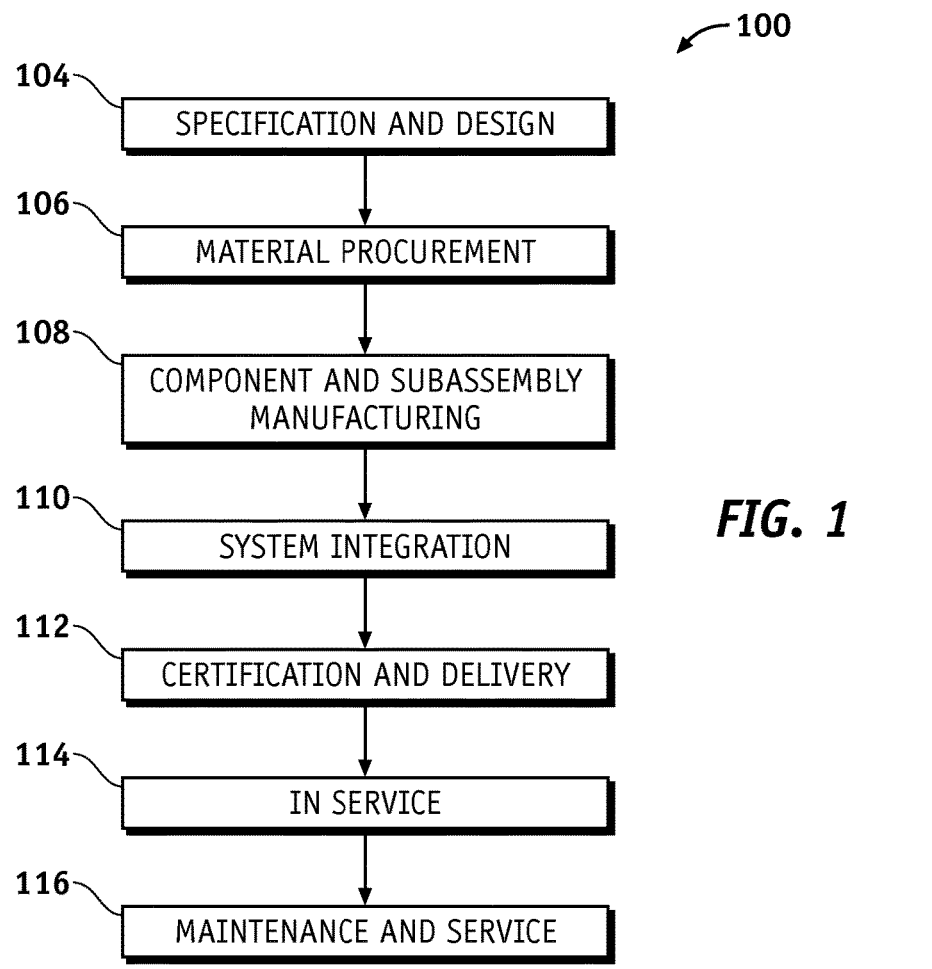
FIG. 1 is an illustration of a flow diagram of an exemplary aircraft production and service methodology.

The following detailed description is exemplary in nature and is not intended to limit the disclosure or the application and uses of the configurations of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Configurations of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aircraft, aircraft components, fuel systems, and other functional aspects of the systems (and the individual operating components of the systems) may not be described in detail herein. In addition, those skilled in the art will appreciate that configurations of the present disclosure may be practiced in conjunction with a variety of structural bodies, and that the configurations described herein are merely example configurations of the disclosure.

Configurations of the disclosure are described herein in the context of some non-limiting applications, namely, an aircraft. Configurations of the disclosure, however, are not limited to such aircraft, and the techniques described herein may also be utilized in other applications. For example, configurations may be applicable to submarines, spacecraft, hydroplanes, or other application.

As would be apparent to one of ordinary skill in the art after reading this description, the following are examples and configurations of the disclosure and are not limited to operating in accordance with these examples. Other configurations may be utilized and structural changes may be made without departing from the scope of the exemplary configurations of the present disclosure.

Configurations provide an efficient low carbon emission airplane integrating jet fuel and cryofuel systems. An airplane fitted with such systems could potentially achieve reduced mission fuel burn, reduced mission cash airplane-related operating costs, reduced total airplane-related operating costs, and reduced carbon dioxide emissions. Configurations can be understood by considering differences relative to existing aircraft that accommodate jet fuel in wing fuel tanks and/or body fuel tanks as is known in the existing aircraft design and manufacture.

Figure 2:
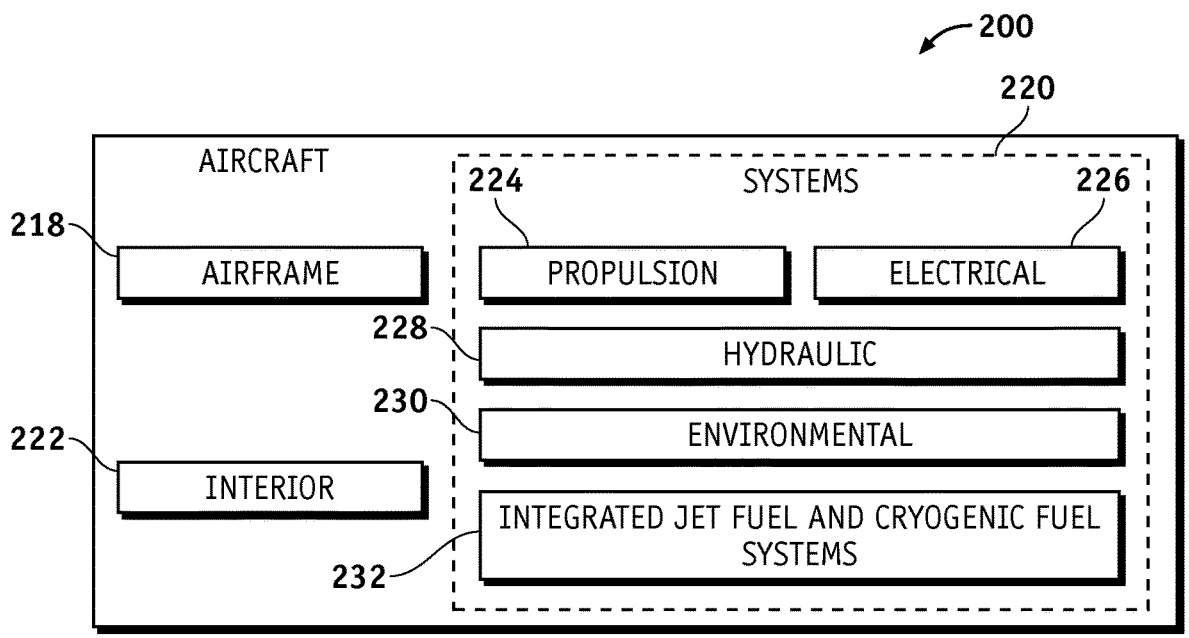
FIG. 2 is an illustration of an exemplary block diagram of an aircraft.

Referring more particularly to the drawings, configurations of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 2, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental control system 230, and one or more integrated jet fuel and cryogenic fuel systems 232. The one or more integrated jet fuel and cryogenic fuel systems 232. Any number of other systems may also be included. Although an aerospace example is shown, the configurations of the disclosure may be applied to other industries.

It should not be inferred from FIG. 2 that an airplane comprises a single, thermal management or, heat exchanger system that manages waste heat from multiple systems. Rather, each system generally comprises one or more heat exchangers to manage waste heat produced by its components.

Apparatus and methods configured herein may be employed during any one or more of the stages of the method 100. For example, components or subassemblies corresponding to production process 108 may be fabricated or manufactured in a manner similar to components or subassemblies produced while the aircraft 200 is in service. In addition, one or more apparatus configurations, method configurations, or a combination thereof may be utilized during production processes 108 and 110, for example, by substantially expediting assembly of or reducing the cost of an aircraft 200. Similarly, one or more of apparatus configurations, method configurations, or a combination thereof may be utilized while the aircraft 200 is in service, for example and without limitation, to maintenance and service 116.

Figure 3:
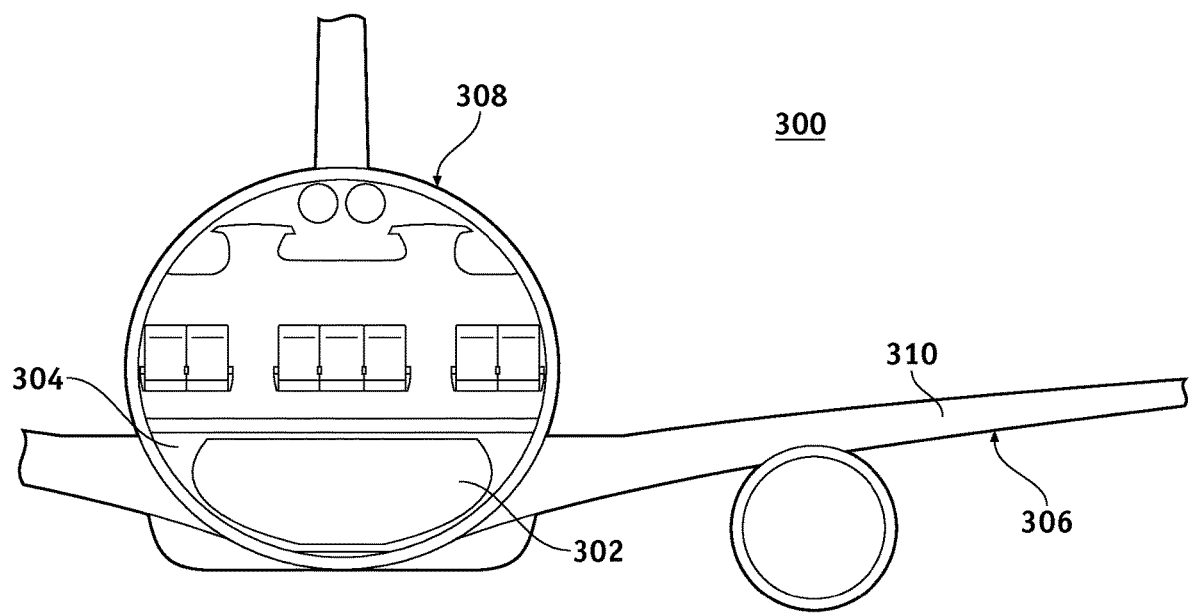
FIG. 3 is an illustration of a hybrid fuel airplane configuration showing a cryogenic fuel tank in a center wing box portion of a wing of a low-wing airplane according to a configuration of the disclosure.

FIG. 3 is an illustration of a hybrid fuel airplane configuration 300 showing a cryogenic fuel tank 302 in a center wing box portion 304 of a wing 306 of a low-wing airplane 308 according to a configuration of the disclosure. The cryogenic fuel tank 302 may comprise, for example but without limitation, a liquid hydrogen tank for carrying liquid hydrogen, or other cryogenic fuel tank suitable for carrying other cryogenic fuel. Jet fuel is stored in a wing box tank 310 of the wing 306.

Figure 4:
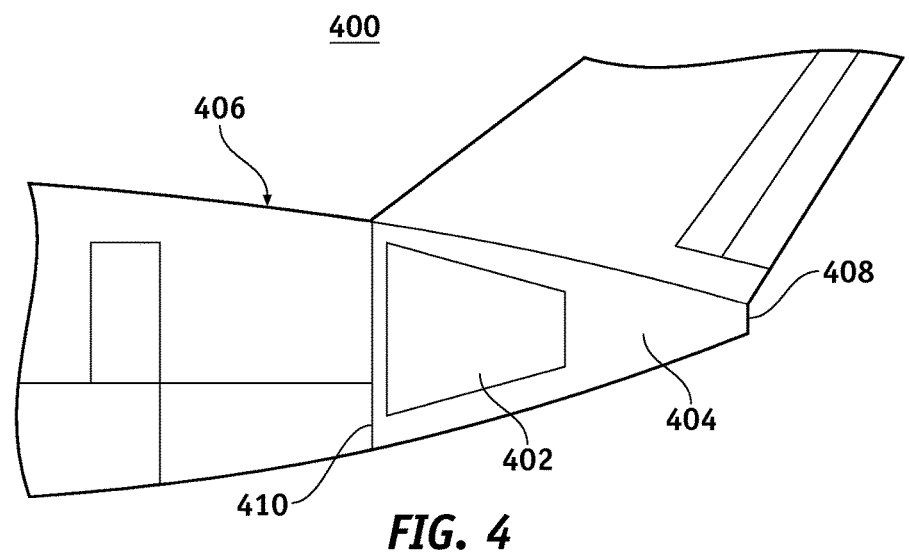
FIG. 4 is an illustration of a hybrid fuel airplane configuration showing an aft-fuselage-cryogenic-fuel-tank in an aft fuselage closure portion of an airplane according to a configuration of the disclosure.

FIG. 4 is an illustration of a hybrid fuel airplane configuration 400 showing an aft-fuselage-cryogenic-fuel-tank 402 in an aft fuselage closure portion 404 of an airplane 406 according to a configuration of the disclosure. The aft fuselage closure portion 404 is located behind an aft pressure bulkhead 410 and forward of an aft tailcone 408 that can house an auxiliary power unit (APU), such as but without limitation, a fuel cell APU, a diesel cycle APU, a gas turbine APU, or other APU.

Figure 5:
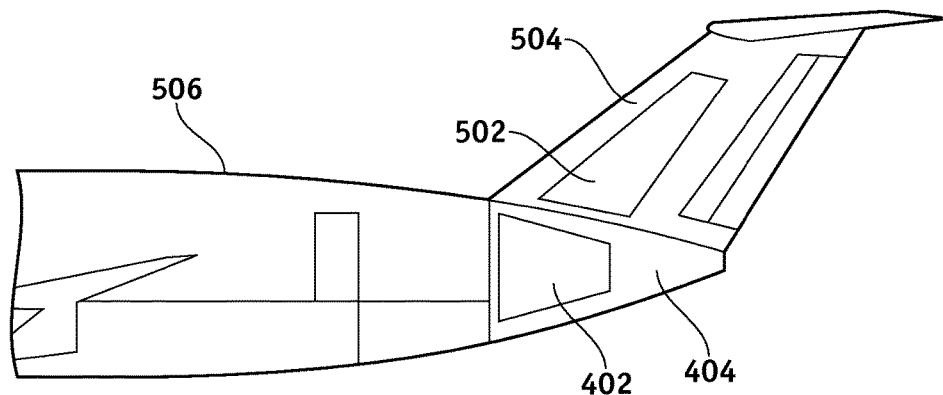
FIG. 5 is an illustration of a hybrid fuel airplane configuration showing an aft-fuselage-cryogenic-fuel-tank in an aft fuselage closure portion and a vertical tail cryogenic fuel tank in a vertical tail portion of an airplane according to a configuration of the disclosure.

FIG. 5 is an illustration of a hybrid fuel airplane configuration 500 showing an aft-fuselage-cryogenic-fuel-tank 402 in the aft fuselage closure portion 404 and a vertical tail cryogenic fuel tank 502 in the vertical tail portion 504 of an airplane 506 according to a configuration of the disclosure.

Figure 6:
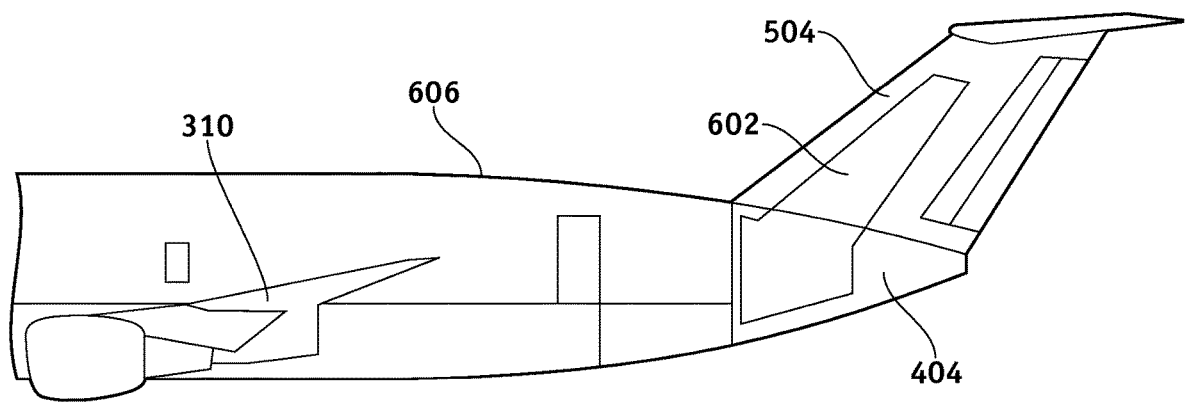
FIG. 6 is an illustration of a hybrid fuel airplane configuration showing an integrated-tail-and-aft-fuselage cryogenic fuel tank in an integrated vertical tail portion and aft fuselage closure portion in an airplane according to a configuration of the disclosure.

FIG. 6 is an illustration of a hybrid fuel airplane configuration 600 showing an integrated-tail-and-aft-fuselage cryogenic fuel tank 602 in an integrated vertical tail portion 504 and the aft fuselage closure portion 404 in an airplane 606 according to a configuration of the disclosure.

Figure 7:
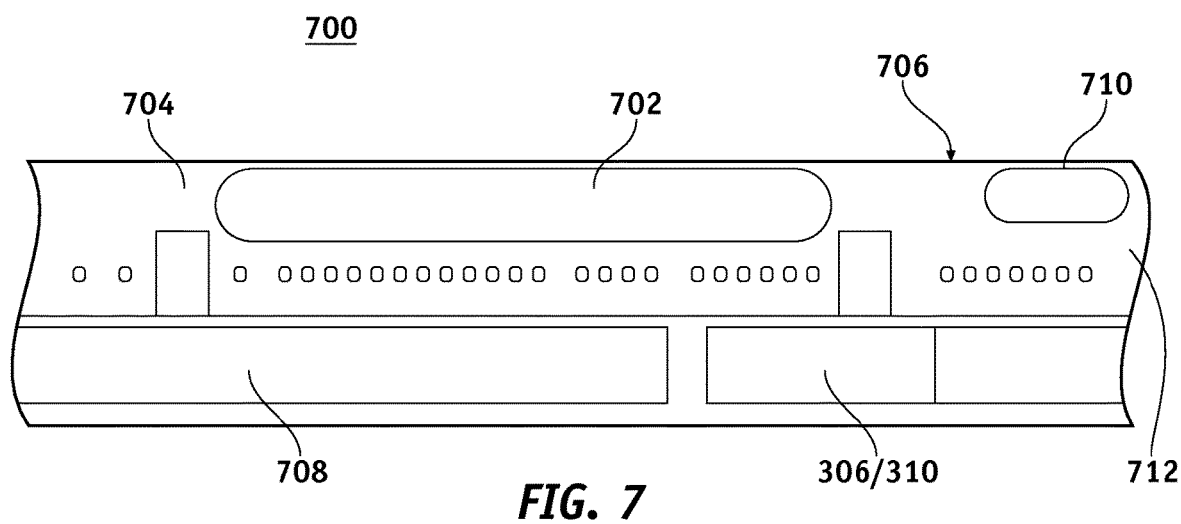
FIG. 7 is an illustration of a hybrid fuel airplane configuration showing a fuselage-crown cryogenic fuel tank in a fuselage crown portion of an airplane according to a configuration of the disclosure.

FIG. 7 is an illustration of a hybrid fuel airplane configuration 700 showing a fuselage-crown cryogenic fuel tank 702 in a fuselage crown portion 704 of an airplane 706 according to a configuration of the disclosure. A cryogenic fuel tank 710 may also be located in a center fuselage portion 712 according to a configuration of the disclosure.

Figure 8:
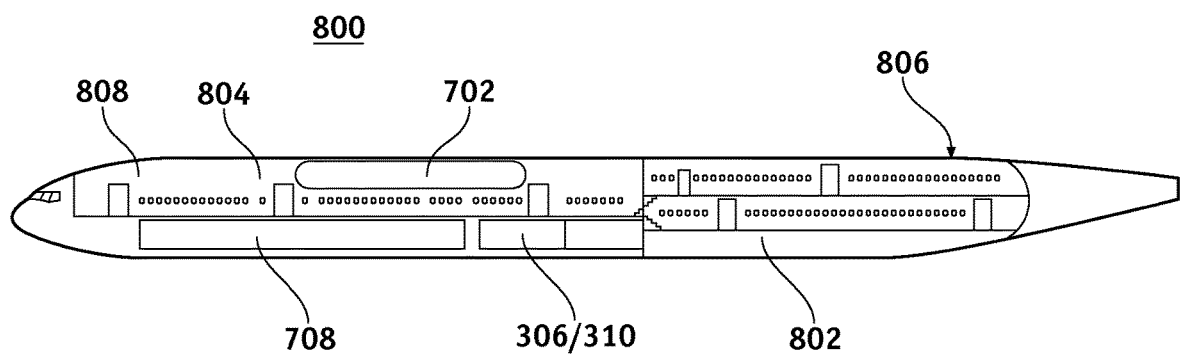
FIG. 8 is an illustration of a hybrid fuel airplane configuration showing a fuselage-crown cryogenic fuel tank in a fuselage crown portion of a forward body of a split-level body low-wing airplane according to a configuration of the disclosure.

FIG. 8 is an illustration of a hybrid fuel airplane configuration 800 showing a fuselage-crown cryogenic fuel tank 702 (a forward-body cryogenic fuel tank 702) in a fuselage crown portion 804 of a forward body portion 808 (forward fuselage portion 808) of a split-level body low-wing airplane 806 according to a configuration of the disclosure.

Figure 9:
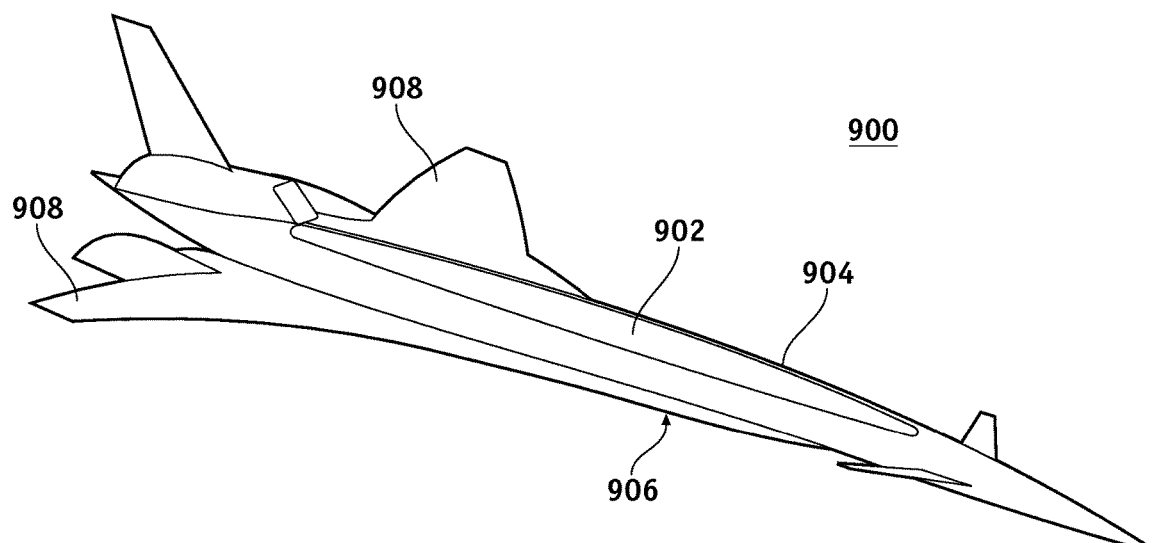
FIG. 9 is an illustration of a supersonic hybrid fuel airplane configuration showing a supersonic fuselage-crown cryogenic fuel tank in a supersonic fuselage-crown portion of a supersonic airplane according to a configuration of the disclosure.

FIG. 9 is an illustration of a supersonic hybrid fuel airplane configuration 900 showing a supersonic fuselage-crown cryogenic fuel tank 902 in a supersonic fuselage-crown portion 904 of a supersonic airplane 906 according to a configuration of the disclosure. The supersonic fuselage crown cryogenic fuel tank 902 may be located between a passenger cabin (not shown) and the supersonic fuselage-crown portion 904. The supersonic fuselage-crown portion 904 is heightened for area-ruling drag reduction reasons and can geometrically vary in order to achieve zero-lift wave drag reduction. The supersonic fuselage-crown portion 904 is used to accommodate the supersonic fuselage-crown cryogenic fuel tank 902. Jet fuel is stored in a wing box tank (not shown) of wings 908.

Figure 10:
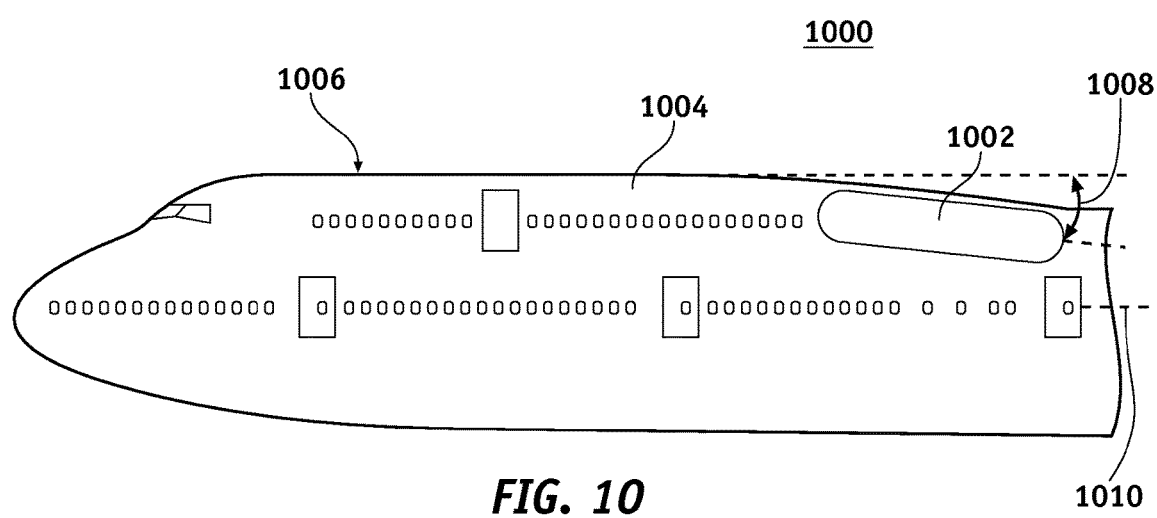
FIG. 10 is an illustration of a hybrid fuel airplane configuration showing a fuselage-crown cryogenic fuel tank in a fuselage crown portion of a deck-and-a-half airplane according to a configuration of the disclosure.

FIG. 10 is an illustration of a hybrid fuel airplane 1000 showing a fuselage-crown cryogenic fuel tank 1002 in a fuselage crown portion 1004 of a deck-and-a-half airplane 1006 according to a configuration of the disclosure.

Figure 11:
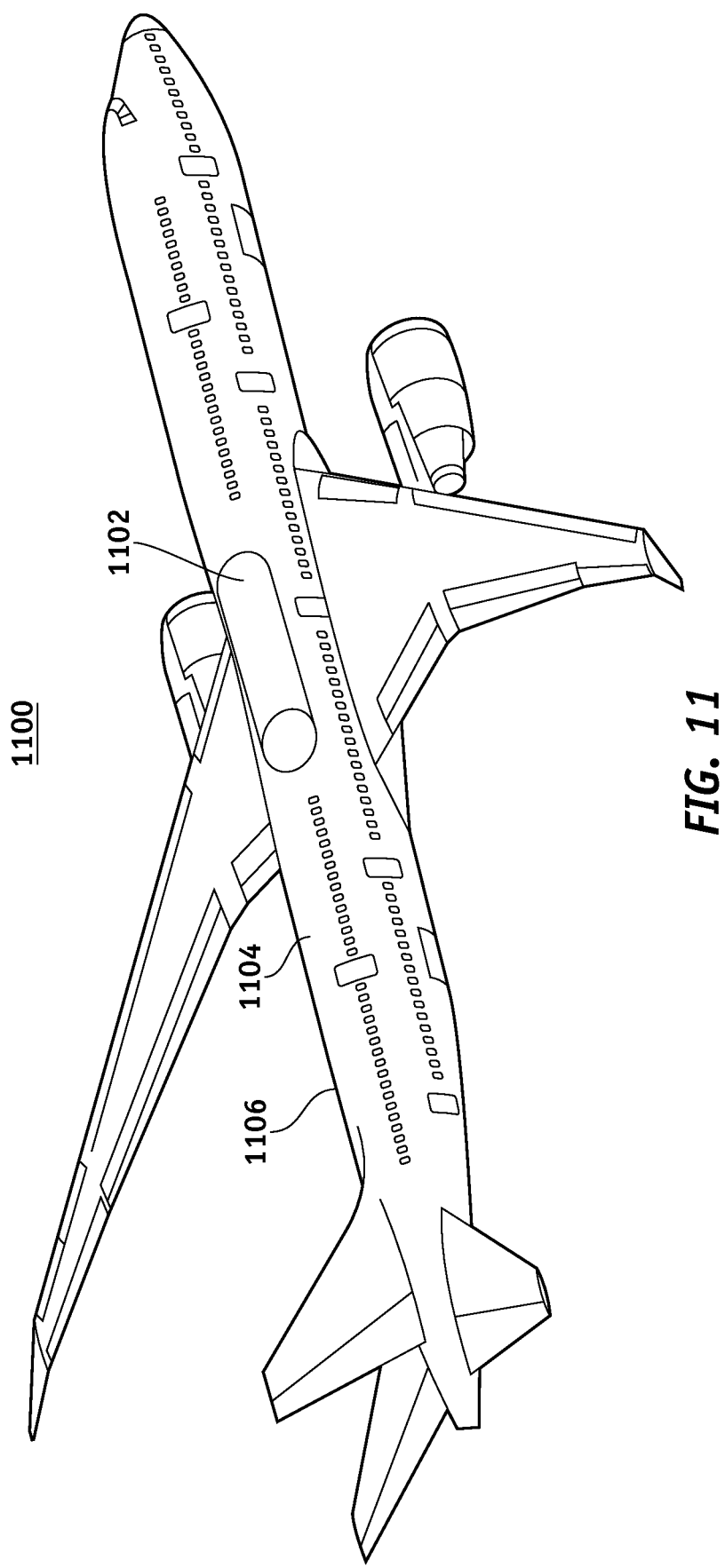
FIG. 11 is an illustration of a hybrid fuel airplane configuration showing a crown-saddle cryogenic fuel tank in a crown saddle region of a double-hump or "Bactrian" airplane according to a configuration of the disclosure.

FIG. 11 is an illustration of a hybrid fuel airplane configuration 1100 showing a crown-saddle cryogenic fuel tank 1102 in a crown saddle region 1104 of a double-hump or "Bactrian" airplane 1106 according to a configuration of the disclosure.

Figure 12:
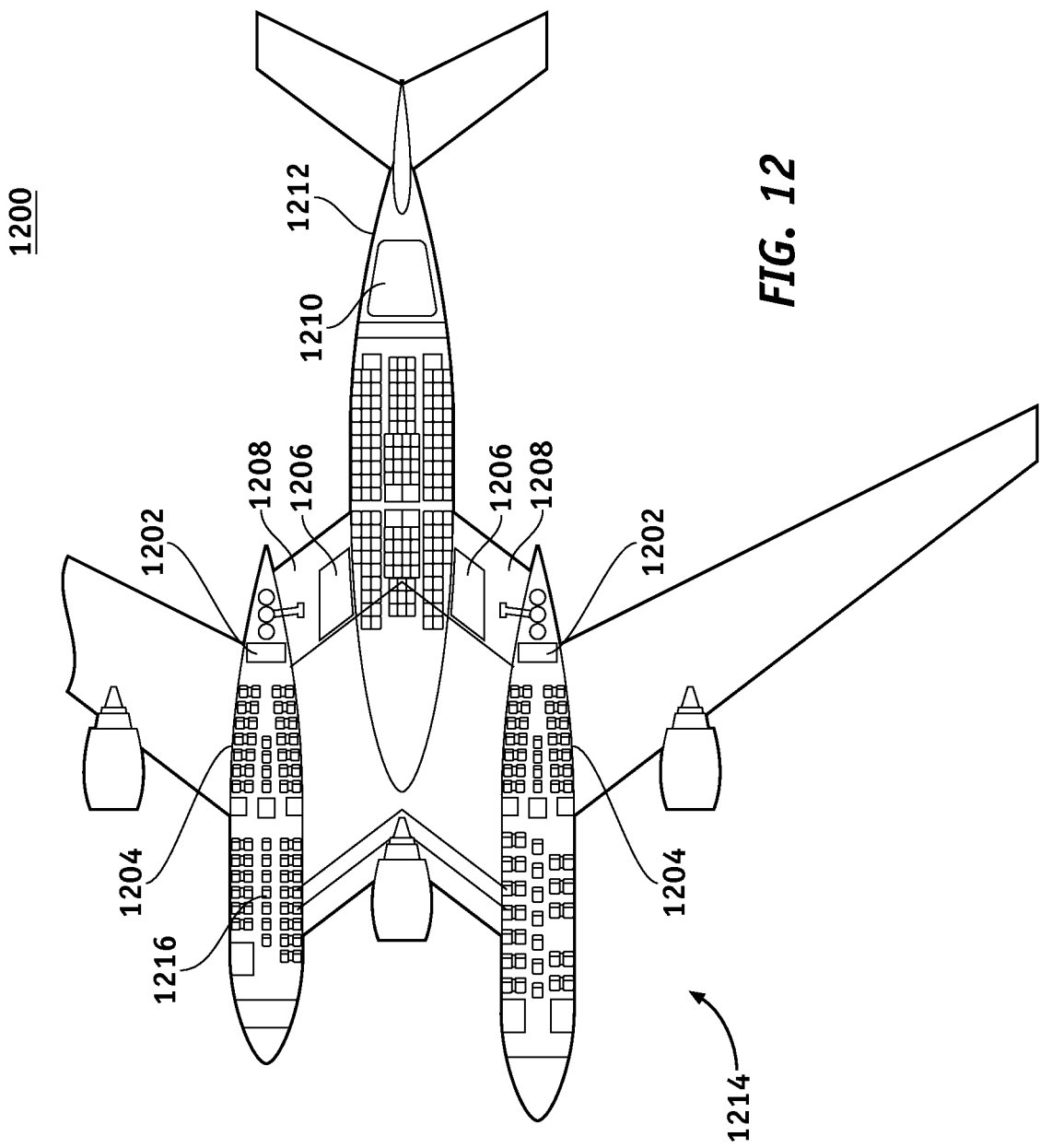
FIG. 12 is an installation of a hybrid fuel airplane configuration showing an aft-body cryogenic fuel tank in an aft body portion, an aft-center-wing cryogenic fuel tank in an aft center wing portion, and an aft-body cryogenic fuel tank in an aft body portion of a blended tri body airplane configuration according to a configuration of the disclosure.

FIG. 12 is an installation of a hybrid fuel airplane configuration 1200 showing an aft-body cryogenic fuel tank 1202 in an aft body portion 1204 (aft fuselage portion 1204), an aft-center-wing cryogenic fuel tank 1206 in an aft center wing portion 1208, an aft-body cryogenic fuel tank 1210 in aft body portion 1212 (aft fuselage portion 1212) of a blended tri body airplane 1214 according to a configuration of the disclosure.

Figure 13:
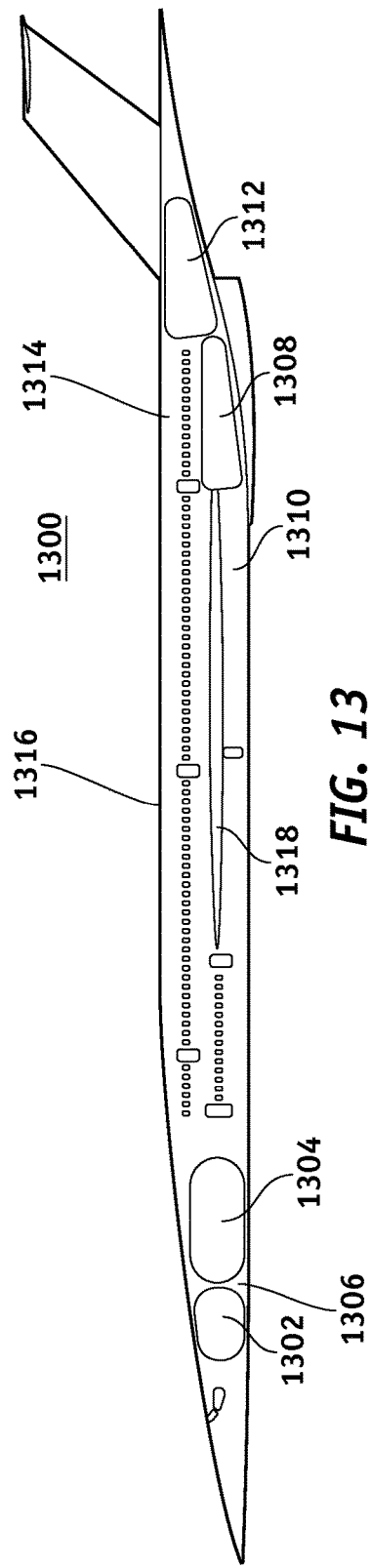
FIGS. 13-14 are illustrations of a side view and an isometric view, respectively of a supersonic hybrid fuel airplane configuration showing a first forward-supersonic-fuselage cryogenic fuel tank located forward of a second forward-supersonic-fuselage cryogenic fuel tank in a supersonic forward fuselage/body portion, a lower aft-supersonic-fuselage cryogenic fuel tank located in a supersonic lower aft fuselage portion, and an upper aft-supersonic-fuselage cryogenic fuel tank located in a supersonic upper aft fuselage/body portion of a supersonic airplane according to a configuration of the disclosure.
Figure 14:
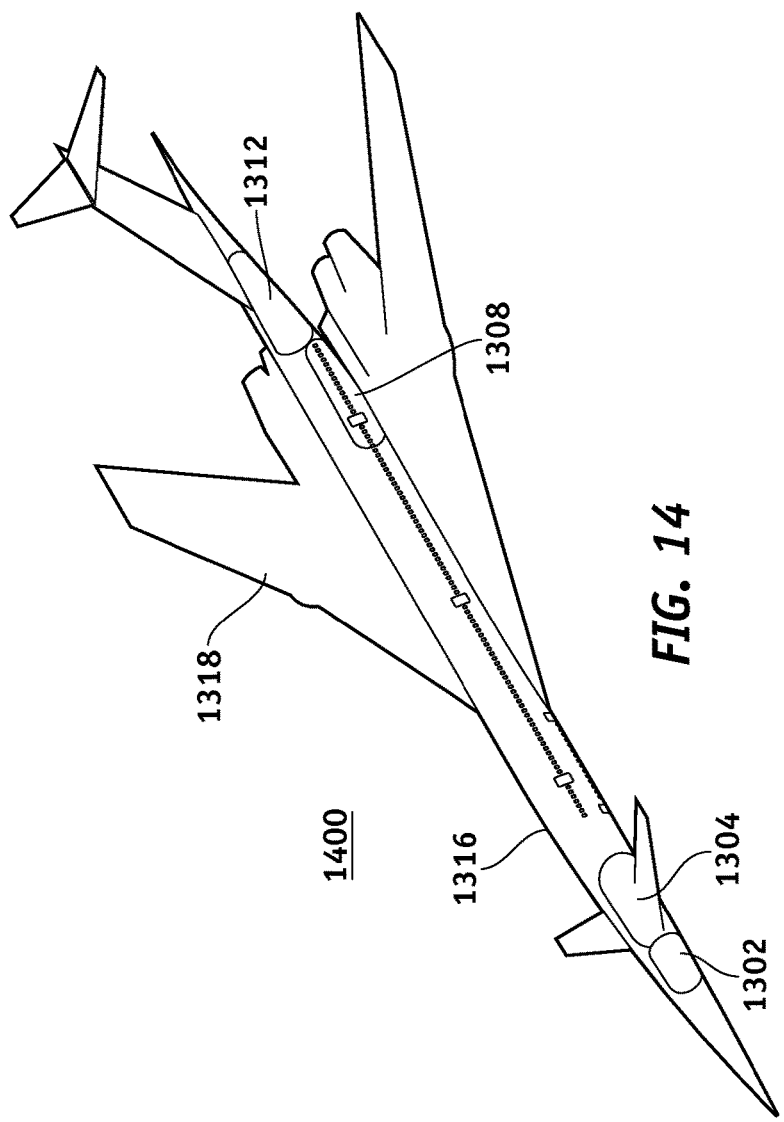

FIGS. 13-14 are illustrations of a side view and an isometric view, respectively of a supersonic hybrid fuel airplane configuration 1300/1400, respectively showing a first forward-supersonic-fuselage cryogenic fuel tank 1302 located forward of a second forward-supersonic-fuselage cryogenic fuel tank 1304 in a supersonic forward fuselage/body portion 1306, a lower aft-supersonic-fuselage cryogenic fuel tank 1308 located in a supersonic lower aft fuselage portion 1310, an upper aft-supersonic-fuselage cryogenic fuel tank 1312 located in a supersonic upper aft fuselage/body portion 1314 of a supersonic airplane 1316, and a wing 1318 according to a configuration of the disclosure.

Figure 15:
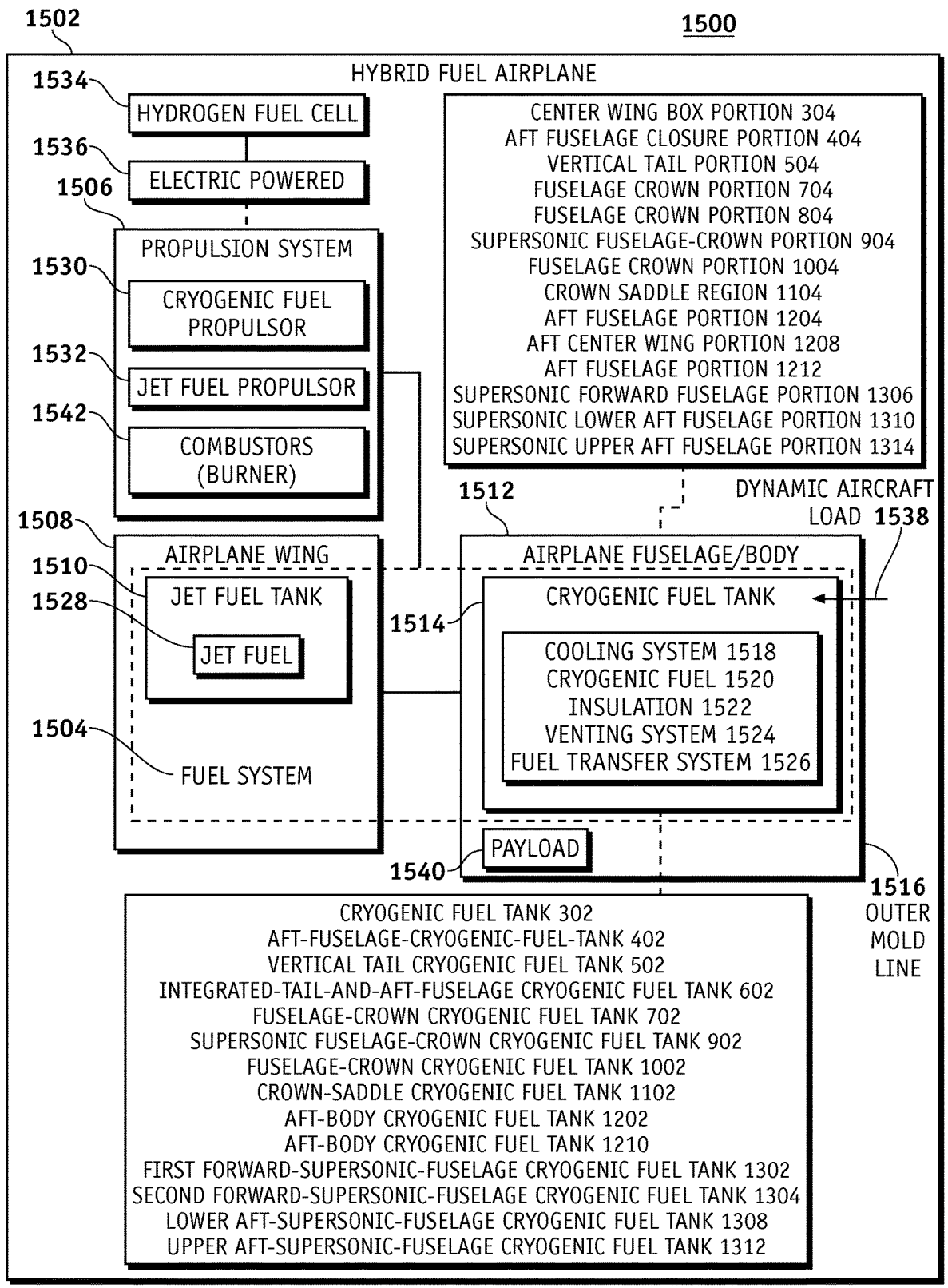
FIG. 15 is an illustration of a schematic block diagram of a hybrid fuel aircraft according to a configuration of the disclosure.

FIG. 15 is an illustration of a schematic block diagram of a hybrid fuel airplane 1500 according to a configuration of the disclosure. The hybrid fuel airplane 1500 comprises an airplane wing 1508, an airplane fuselage/body 1512, a hybrid fuel airplane fuel system 1504, an airplane propulsion system 1506, a hydrogen fuel cell 1534, and an electrically powered propulsor 1536.

The hybrid fuel airplane 1500 may comprise, for example but without limitation, the low-wing airplane 308, the airplane 406/506/606/706, the split-level body low-wing airplane 806, the supersonic airplane 906, the deck-and-a-half airplane 1006, the double-hump airplane 1106, the blended tri body airplane 1214, the supersonic airplane 1316, or other hybrid fuel airplane configuration.

The airplane wing 1508 is coupled to the airplane fuselage/body 1512 and is configured to generate aerodynamic lift. The airplane wing 1508 comprises a jet fuel tank 1510 configured to carry jet fuel 1528. The airplane fuselage/body 1512 may comprise a jet fuel tank 1510 configured to carry jet fuel 1528.

The airplane fuselage/body 1512 is conformed to an outer mold line (OML) 1516 of the airplane fuselage/body 1512. The airplane fuselage/body 1512 comprises at least one cryogenic fuel tank 1514 configured to carry cryogenic fuel 1520. The airplane fuselage/body 1512 may further comprise at least one jet fuel tank 1510 configured to carry jet fuel 1528. The cryogenic fuel tank 1514 is located in a portion of the airplane fuselage/body 1512 while not extending beyond the OML 1516. The airplane fuselage/body 1512 may comprise a payload area 1540, such as but without limitation, a cargo area (e.g., 708 in FIGS. 7 and 802 in FIG. 8) to carry a cargo, a passenger area (e.g., 1216 in FIG. 12) to carry at least one passenger, or a combination thereof.

The passenger area may comprise a passenger cabin to accommodate at least one passenger. The passenger cabin is configured to optimize use of an enclosed volume in the airplane fuselage/body 1512 within a bounding envelope defined by the outer mold line 1516 to maximize a number of seats of a "specified dimensionally defined comfort level" in the passenger cabin while meeting a specified set of passenger cabin certification requirements. The "specified dimensionally defined comfort level" may comprise measures, such as but without limitation, seat pitch (e.g., about 71.12 cm (about 28 inches) to about 91.44 cm (about 36 inches) in economy class), seat bottom width (e.g., about 41.91 cm (about 16.5 inches) to about 49.53 cm (about 19.5 inches) in economy class), armrest width (e.g., about 2.54 cm (about 1 in) to about 7.62 cm (about 3 inches) in economy class), typical seated occupant to adjacent seated occupant or sidewall clearances at foot, buttock, armrest, shoulder and head levels, typical aisle widths and heights, and other metrics known in the art of aircraft passenger cabins.

Additionally, a specified set of passenger cabin certification requirements may comprise, for example but without limitation, Federal Aviation Administration (FAA) requirements, European Aviation Safety Agency (EASA) requirements, or other requirements. The specified set of cabin certification requirements may comprise, for example but without limitation, requirements on a passenger cabin environment (e.g., temperature, ventilation, lighting, vibration, etc.), requirements for land or water emergency evacuation, requirements for provision of oxygen in an event of a passenger cabin depressurization, or other desired passenger cabin characteristic.

The portion of the airplane fuselage/body 1512 may comprise, for example but without limitation, the center wing box portion 304, the aft fuselage closure portion 404, the vertical tail portion 504, the supersonic fuselage-crown portion 904, the aft fuselage portion 1204/1212, a center fuselage portion, the forward fuselage portion 808, the fuselage crown portion 1004, the crown saddle region 1104, the aft center wing portion 1208, the supersonic forward fuselage/body portion 1306, the supersonic lower aft fuselage portion 1310, the supersonic upper aft fuselage/body portion 1314, a combination thereof, or other airplane body portion.

The airplane propulsion system 1506 is configured to generate thrust. The airplane propulsion system 1506 comprises at least one cryogenic fuel propulsor 1530 (cryogenic fuel propulsor subsystem 1530) configured to burn the cryogenic fuel 1520, and at least one jet fuel propulsor 1532 (jet fuel propulsor subsystem 1532) configured to burn the jet fuel 1528. In one configuration, the airplane propulsion system 1506 (airplane propulsor 1506) comprises one or more burners 1542 (combustors 1542) configured to burn both the jet fuel 1528 and the cryogenic fuel 1520. In another configuration, the jet fuel propulsor subsystem 1532 and a first combustor of the combustors 1542 burn the jet fuel 1528, and the cryogenic fuel propulsor subsystem 1530 and a second combustor of the combustors 1542 burn the cryogenic fuel 1520. The airplane propulsion system 1506 may comprise, for example but without limitation, a jet engine propulsor, an electrical powered propulsor, or other airplane propulsion system.

The hybrid fuel airplane fuel system 1504 is configured to carry fuel usable by the airplane propulsion system 1506. The hybrid fuel airplane fuel system 1504 comprises at least one cryogenic fuel tank 1514 and at least one jet fuel tank 1510.

The cryogenic fuel tank 1514 is configured to conform to the outer mold line 1516, bear a dynamic aircraft load 1538 and carry the cryogenic fuel 1520. The cryogenic fuel tank 1514 is located in the portion of the airplane fuselage/body 1512 while not extending beyond the outer mold line 1516. The cryogenic fuel tank 1514 may be configured at a tilt angle 1008 relative, for example, to the airplane fuselage/body 1512 centerline 1010, or any other orientation suitable for conforming to the outer mold line 1516.

The dynamic aircraft load 1538, may comprise for example but without limitation, a vibration load, a dynamic pressure load, a proof and burst load requirement, an aircraft structural load, or a combination thereof. The proof and burst load requirement may comprise, for example but without limitation, requirements defined by Federal Aviation Administration (FAA), European Aviation Safety Agency (EASA), or other similar organizations. For example but without limitation, pressurization system elements may be required to be burst pressure tested to 2 times a maximum normal operating pressure, and proof pressure tested to 1.2 times the maximum normal operating pressure, or other measure.

The cryogenic fuel 1520 may comprise, for example but without limitation, liquid methane, liquid natural gas, liquid hydrogen, cryo-compressed hydrogen, or other suitable cryogenic fuel.

The hydrogen fuel cell 1534 is powered by hydrogen obtained from the liquid hydrogen. Electric power from the hydrogen fuel cell 1534 is configured to drive the electrically powered propulsor 1536.

The cryogenic fuel tank 1514 may comprise a cooling system 1518 configured to keep the cryogenic fuel 1520 contained therein at a sufficiently low temperature suitable for operation of the cryogenic fuel 1520 (e.g., about −160° C. (about −256° F.) for liquefied natural gas (LNG) and about −250° C. (about −418° F.) for liquid hydrogen, etc. for some cryogenic fuels). The cryogenic fuel tank 1514 may also comprise an insulation 1522 configured to minimize heat transfer from an external environment into the cryogenic fuel 1520. The cryogenic fuel tank 1514 may also comprise a venting system 1524 configured to vent the cryogenic fuel tank 1514.

The cryogenic fuel tank 1514 may also comprise a cryogenic fuel transfer system 1526 configured to transfer the cryogenic fuel 1520 from the cryogenic fuel tank 1514 to at least one propulsor subsystem such as the cryogenic fuel propulsor 1530 configured to burn the cryogenic fuel 1520 or other combustor suitable for burning the cryogenic fuel 1520. The cryogenic fuel tank 1514 may comprise for example but without limitation, a high vacuum multi-layer composite, or other cryogenic fuel tank.

The cryogenic fuel tank 1514 may comprise, for example but without limitation, the cryogenic fuel tank 302, the aft-fuselage-cryogenic-fuel-tank 402, the vertical tail cryogenic fuel tank 502, the integrated-tail-and-aft-fuselage cryogenic fuel tank 602, the fuselage-crown cryogenic fuel tank 702, the supersonic fuselage-crown cryogenic fuel tank 902, the fuselage-crown cryogenic fuel tank 1002, the crown-saddle cryogenic fuel tank 1102, the aft-body cryogenic fuel tank 1202/1210, the first forward-supersonic-fuselage cryogenic fuel tank 1302, the second forward-supersonic-fuselage cryogenic fuel tank 1304, the lower aft-supersonic-fuselage cryogenic fuel tank 1308, the upper aft-supersonic-fuselage cryogenic fuel tank 1312, or a combination thereof.

The jet fuel tank 1510 is configured to carry jet fuel 1528 and may be located in the airplane wing 1508, or the airplane fuselage/body 1512, or both. The jet fuel 1528 may comprise, for example but without limitation, non-bio jet fuel, bio jet fuel, Jet-A, Jet A-1, JP-4, JP-5, JP-7, JP-8, JP-10, or other suitable jet fuel.

Figure 16:
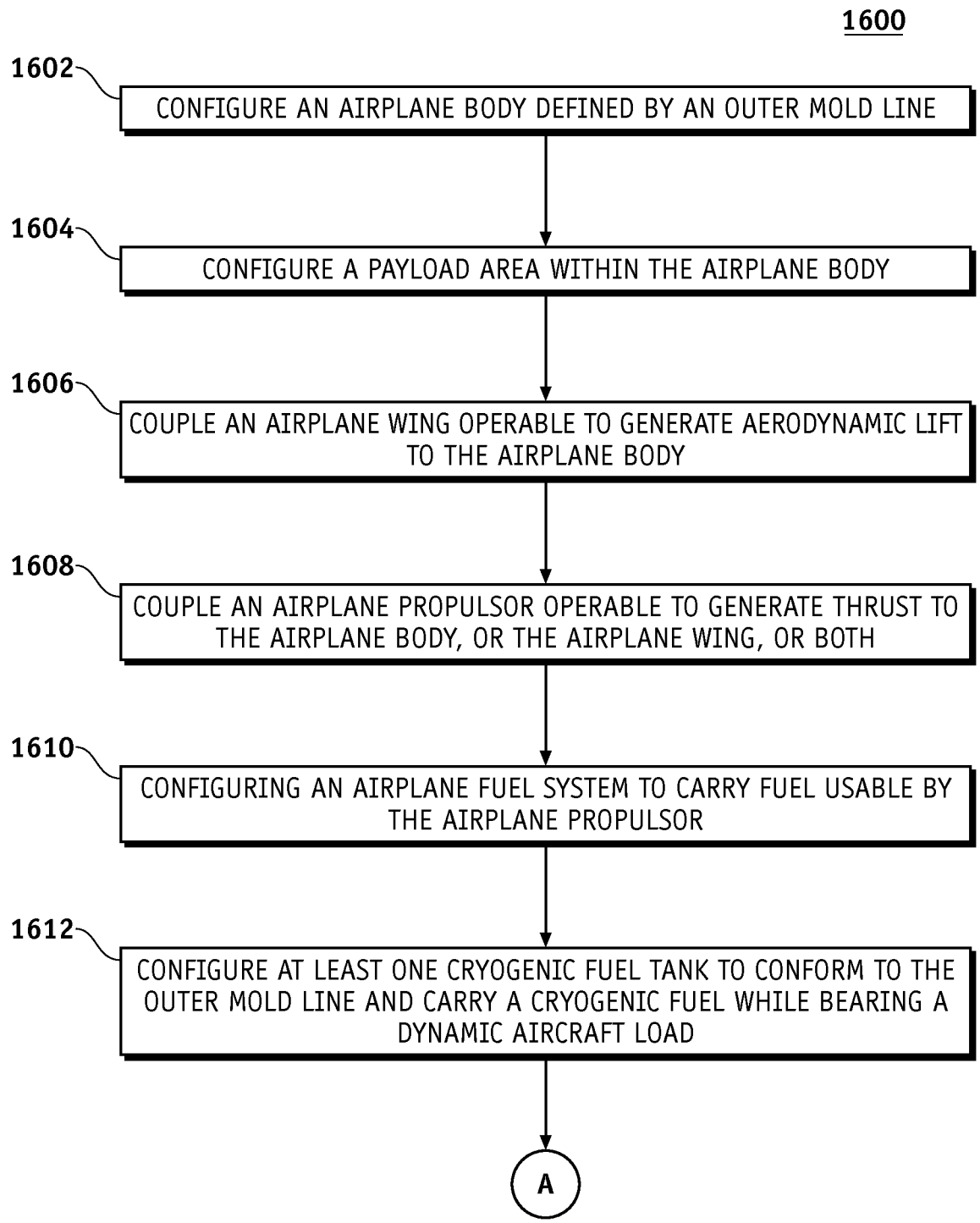
FIG. 16 is an illustration of an exemplary flowchart showing a process for configuring a hybrid fuel airplane according to a configuration of the disclosure.
Figure 16:
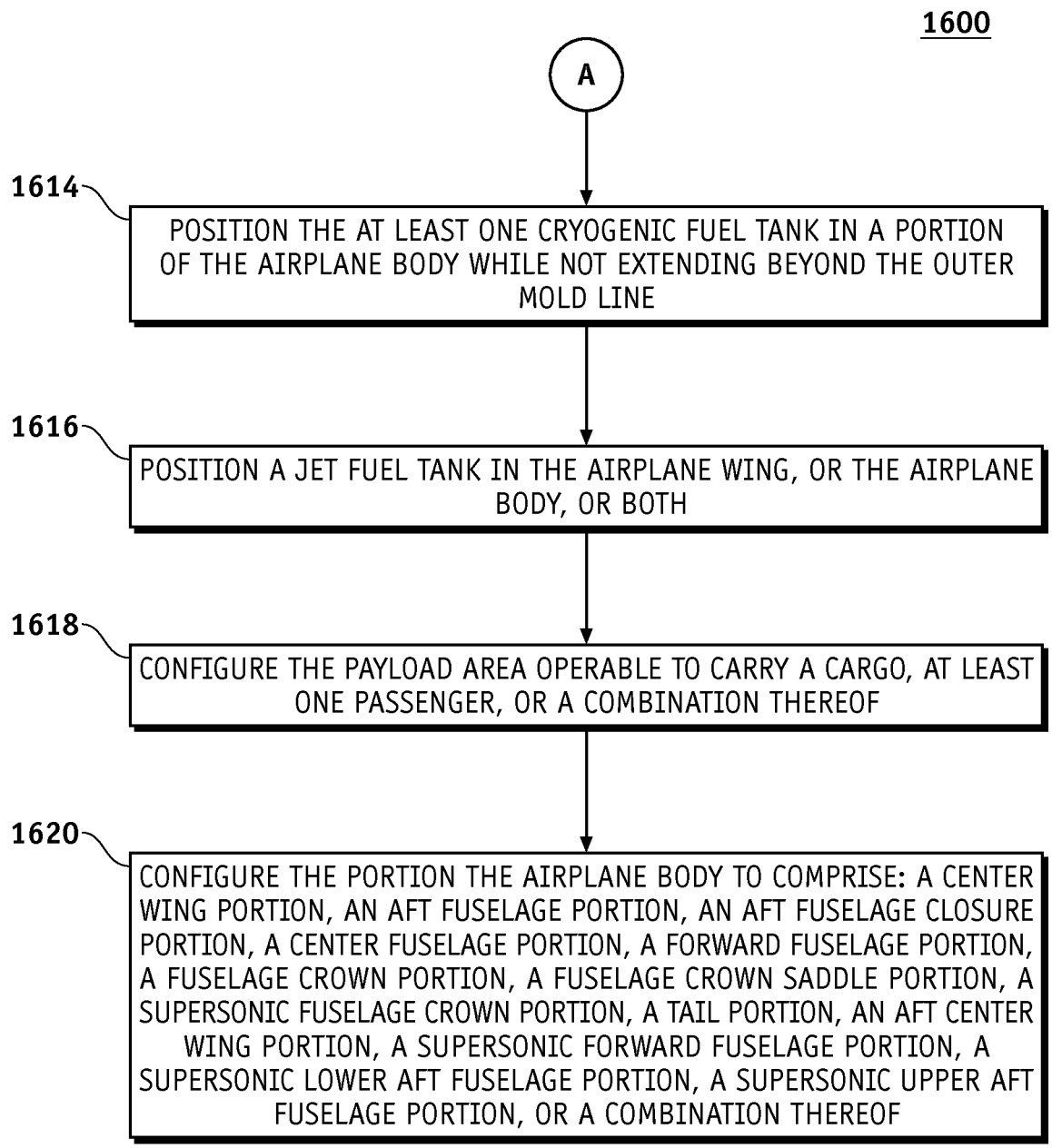

FIG. 16 is an illustration of an exemplary flowchart showing a process 1600 for configuring a hybrid fuel airplane according to a configuration of the disclosure. The various tasks performed in connection with process 1600 may be performed mechanically, by software, hardware, firmware, or any combination thereof. For illustrative purposes, the following description of process 1600 may refer to elements mentioned above in connection with FIGS. 1-15. In some configurations, portions of the process 1600 may be performed by different elements of the hybrid fuel airplane 1500 such as: the airplane wing 1508, the airplane fuselage/body 1512, the hybrid fuel airplane fuel system 1504, the airplane propulsion system 1506, etc. Process 1600 may have functions, material, and structures that are similar to the configurations shown in FIGS. 1-15. Therefore common features, functions, and elements may not be redundantly described here.

Process 1600 may begin by configuring an airplane body such as the airplane body/fuselage 1512 defined by an outer mold line such as the outer mold line 1516 (task 1602).

Process 1600 may continue by configuring a payload area such as the payload area 1540 within the airplane body 1512 (task 1604).

Process 1600 may continue by coupling an airplane wing such as the airplane wing 1508 operable to generate aerodynamic lift to the airplane body 1512 (task 1606).

Process 1600 may continue by coupling an airplane propulsor such as the airplane propulsion system 1506 operable to generate thrust to the airplane body 1512, or the airplane wing 1508, or both (task 1608).

Process 1600 may continue by configuring an airplane fuel system such as the hybrid fuel airplane fuel system 1504 to carry fuel usable by the airplane propulsor 1506 (task 1610).

Process 1600 may continue by configuring at least one cryogenic fuel tank such as the cryogenic fuel tank 1514 to conform to the outer mold line 1516 and carry a cryogenic fuel such as the cryogenic fuel 1520 while bearing a dynamic aircraft load such as the dynamic aircraft load 1538 (task 1612).

Process 1600 may continue by positioning the at least one cryogenic fuel tank 1514 in a portion of the airplane body 1512 while not extending beyond the outer mold line 1516 (task 1614).

Process 1600 may continue by positioning a jet fuel tank such as the jet fuel tank 1510 in the airplane wing 1508, or the airplane fuselage 1512, or both (task 1616).

Process 1600 may continue by configuring the payload area 1540 operable to carry a cargo, at least one passenger, or a combination thereof (task 1618).

Process 1600 may continue by configuring the portion of the airplane body 1512 to comprise: a center wing portion such as the center wing box portion 304, an aft fuselage closure portion such as the aft fuselage closure portion 404, an aft fuselage portion such as the aft fuselage portion 1204/1212, a center fuselage portion such as the center fuselage portion 712, a forward fuselage portion such as the forward fuselage portion 808, a fuselage crown portion such as the fuselage crown portion 704, a fuselage crown saddle portion (region) such as the crown saddle region 1104, a supersonic fuselage crown portion such as the supersonic fuselage-crown portion 904, a tail portion such as the vertical tail portion 504, an aft center wing portion such as the aft center wing portion 1208, a supersonic forward fuselage portion such as the supersonic forward fuselage portion 1306, a supersonic lower aft fuselage portion such as the supersonic lower aft fuselage portion 1310, a supersonic upper aft fuselage portion such as the supersonic upper aft fuselage portion 1314, or a combination thereof (task 1620).

Figure 17:
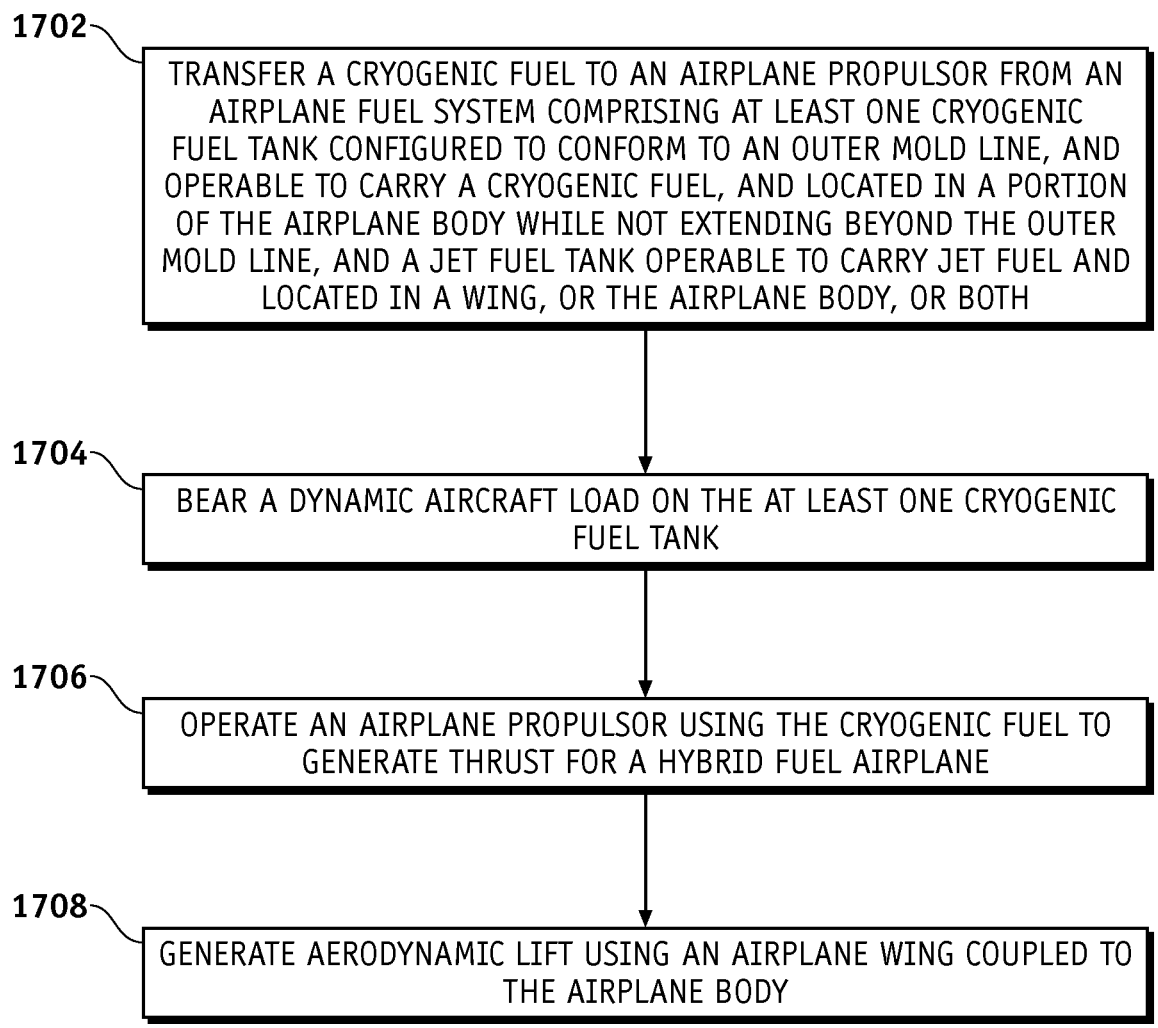
FIG. 17 is an illustration of an exemplary flowchart showing a process for operating a hybrid fuel airplane according to a configuration of the disclosure

FIG. 17 is an illustration of an exemplary flowchart showing a process 1700 for operating a hybrid fuel airplane according to a configuration of the disclosure. The various tasks performed in connection with process 1700 may be performed mechanically, by software, hardware, firmware, or any combination thereof. For illustrative purposes, the following description of process 1700 may refer to elements mentioned above in connection with FIGS. 1-15. In some configurations, portions of the process 1700 may be performed by different elements of the hybrid fuel airplane 1500 such as: the airplane wing 1508, the airplane fuselage/body 1512, the hybrid fuel airplane fuel system 1504, the airplane propulsion system 1506, etc. Process 1700 may have functions, material, and structures that are similar to the configurations shown in FIGS. 1-15. Therefore common features, functions, and elements may not be redundantly described here.

Process 1700 may begin by transferring a cryogenic fuel such as the cryogenic fuel 1520 to an airplane propulsor such as the propulsion system 1506 from an airplane fuel system such as the hybrid fuel airplane fuel system 1504 comprising at least one cryogenic fuel tank such as the cryogenic fuel tank 1514 configured to conform to an outer mold line such as the outer mold line 1516, and operable to carry a cryogenic fuel such as the cryogenic fuel 1520, and located in a portion of an airplane body such as the airplane body 1512 while not extending beyond the outer mold line 1516, and a jet fuel tank such as the jet fuel tank 1510 operable to carry jet fuel such as the jet fuel 1528 and located in a wing such as the airplane wing 1508, or the airplane body 1512, or both (task 1702).

Process 1700 may continue by bearing a dynamic aircraft load such as the dynamic aircraft load 1538 on the at least one cryogenic fuel tank 1514 (task 1704).

Process 1700 may continue by operating an airplane propulsor such as the propulsion system 1506 using the cryogenic fuel 1520 to generate thrust for a hybrid fuel airplane such as the hybrid fuel airplane 1502 (task 1706).

Process 1700 may continue by generating aerodynamic lift using the airplane wing 1508 coupled to the airplane body 1512 (task 1708).

In this manner, configurations of the disclosure provide an efficient low carbon emission hybrid fuel airplane integrating jet fuel and cryogenic fuel systems.

While at least one example configuration has been presented in the foregoing detailed description, it should be appreciated that a vast number of variations exist. It should also be appreciated that the example configuration or configurations described herein are not intended to limit the scope, applicability, or configuration of the subject matter in any way. Rather, the foregoing detailed description will provide those skilled in the art with a convenient road map for implementing the described configuration or configurations. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" should be interpreted to mean that one element/node/feature is directly joined to (or directly communicates with) another element/node/feature, and not necessarily mechanically. Likewise, unless expressly stated otherwise, "coupled" should be interpreted to mean that one element/node/feature is directly or indirectly joined to (or directly or indirectly communicates with) another element/node/feature, and not necessarily mechanically. Thus, although FIGS. 1-15 depict example arrangements of elements, additional intervening elements, devices, features, or components may be present in a configuration of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases shall not be read to mean that the narrower case is intended or required in instances where such broadening phrases may be absent.

The term "about" when referring to a numerical value or range is intended to encompass values resulting from experimental error that can occur when taking measurements.

The invention claimed is:

1. A hybrid fuel airplane comprising:
an airplane body conformed to an outer mold line;
an airplane wing coupled to the airplane body and operable to generate aerodynamic lift;
an airplane propulsor operable to generate thrust; and
an airplane fuel system operable to carry fuel usable by the airplane propulsor and comprising:
at least one cryogenic fuel tank including (i) a first portion located behind an aft pressure bulkhead of the airplane body, forward of an aft tailcone, and below a vertical tail portion of the airplane body, and (ii) a second portion located in the vertical tail portion of the airplane body behind the aft pressure bulkhead, wherein the first portion of the at least one cryogenic fuel tank and the second portion of the at least one cryogenic fuel tank comprise different portions of a single cryogenic fuel tank, wherein the entirety of the at least one cryogenic fuel tank is located behind the aft pressure bulkhead of the airplane body, and wherein the at least one cryogenic fuel tank is in direct fluid communication with the airplane propulsor; and
a jet fuel tank operable to carry jet fuel and located in the airplane wing;
wherein the at least one cryogenic fuel tank comprises a cooling system to maintain the cryogenic fuel contained therein at a sufficiently low temperature.

2. The hybrid fuel airplane of claim 1, wherein the at least one cryogenic fuel tank is operable to bear a dynamic aircraft load, and wherein the dynamic aircraft load comprises at least one of a vibration load, a dynamic pressure load, a proof and burst load requirement, and an aircraft structural load, or a combination thereof.

3. The hybrid fuel airplane of claim 1, wherein the airplane body comprises a payload area operable to carry a cargo, at least one passenger, or a combination thereof, wherein the at least one passenger is accommodated in a passenger cabin comprising an enclosed volume in the airplane body within a bounding envelope defined by the outer mold line, while maximizing a number of seats of a specified dimensionally defined comfort level in the passenger cabin while meeting a specified set of passenger cabin certification requirements.

4. The hybrid fuel airplane of claim 1, wherein another cryogenic fuel tank is located in at least one of a center wing portion, an aft fuselage portion, an aft fuselage closure portion, a center fuselage portion, a forward fuselage portion, a fuselage crown portion, a fuselage crown saddle portion, a supersonic fuselage crown portion, a tail portion, an aft center wing portion, a supersonic forward fuselage portion, a supersonic lower aft fuselage portion, and a supersonic upper aft fuselage portion, or a combination thereof.

5. The hybrid fuel airplane of claim 1, wherein the at least one cryogenic fuel tank comprises an insulation operable to minimize heat transfer from an external environment into a cryogenic fuel positioned in the at least one cryogenic fuel tank.

6. The hybrid fuel airplane of claim 1, wherein the at least one cryogenic fuel tank comprises a venting system operable to vent the at least one cryogenic fuel tank.

7. The hybrid fuel airplane of claim 1, further comprising a cryogenic fuel transfer system operable to transfer a cryogenic fuel from the at least one cryogenic fuel tank to at least one cryogenic fuel propulsor operable to burn the cryogenic fuel.

8. The hybrid fuel airplane of claim 1, wherein a cryogenic fuel positioned in the at least one cryogenic fuel tank comprises at least one of liquid methane, liquid natural gas, liquid hydrogen, and cryo-compressed hydrogen, or a combination thereof.

9. The hybrid fuel airplane of claim 8, further comprising a hydrogen fuel cell powered by hydrogen obtained from liquid hydrogen.

10. The hybrid fuel airplane of claim 9, wherein electric power from the hydrogen fuel cell is operable to drive an electrically powered propulsor.

11. The hybrid fuel airplane of claim 1, wherein the jet fuel comprises: non-bio jet fuel, bio jet fuel, or a combination thereof.

12. The hybrid fuel airplane of claim 1, wherein the airplane propulsor comprises a burner operable to burn the jet fuel from the jet fuel tank and a cryogenic fuel from the at least one cryogenic fuel tank.

13. The hybrid fuel airplane of claim 1, wherein the airplane propulsor comprises a first propulsor subsystem or a first combustor, or both operable to burn the jet fuel from the jet fuel tank, and a second propulsor subsystem or a second combustor, or both operable to burn a cryogenic fuel from the at least one cryogenic fuel tank.

14. The hybrid fuel airplane of claim 1, wherein the at least one cryogenic fuel tank is configured to conform to the outer mold line of the airplane body while not extending beyond the outer mold line.

15. A method for configuring a hybrid fuel airplane comprising:
configuring an airplane body defined by an outer mold line;
configuring a payload area within the airplane body;
coupling an airplane wing operable to generate aerodynamic lift to the airplane body;
coupling an airplane propulsor operable to generate thrust to the airplane body or the airplane wing, or both;
configuring an airplane fuel system to carry fuel usable by the airplane propulsor;
positioning a first portion of at least one cryogenic fuel tank behind an aft pressure bulkhead of the airplane body, forward of an aft tailcone, and below a vertical tail portion of the airplane body, and a second portion of the at least one cryogenic fuel tank in the vertical tail portion of the airplane body behind the aft pressure bulkhead, wherein the first portion of the at least one cryogenic fuel tank and the second portion of the at least one cryogenic fuel tank comprise different portions of a single cryogenic fuel tank and wherein the entirety of the at least one cryogenic fuel tank is located behind the aft pressure bulkhead of the airplane body, and wherein the at least one cryogenic fuel tank is in direct fluid communication with the airplane propulsor;
utilizing a cooling system of the at least one cryogenic fuel tank to maintain the cryogenic fuel contained therein at a sufficiently low temperature; and
positioning a jet fuel tank in the airplane wing, or the airplane body, or both.

16. The method of claim 15, wherein the at least one cryogenic fuel tank is operable to bear a dynamic aircraft load, and wherein the dynamic aircraft load comprises at least one of a vibration load, a dynamic pressure load, a proof and burst load requirement, and an aircraft structural load, or a combination thereof.

17. The method of claim 15, further comprising configuring the payload area operable to carry a cargo, at least one passenger, or a combination thereof, wherein the at least one passenger is accommodated in a passenger cabin comprising an enclosed volume in the airplane body within a bounding envelope defined by the outer mold line, while maximizing a number of seats of a specified dimensionally defined comfort level in the passenger cabin while meeting a specified set of passenger cabin certification requirements.

18. The method of claim 15, wherein positioning the first portion of the at least one cryogenic fuel tank further comprises positioning a second cryogenic fuel tank in at least one of a center wing portion, an aft fuselage portion, an aft fuselage closure portion, a center fuselage portion, a forward fuselage portion, a fuselage crown portion, a fuselage crown saddle portion, a supersonic fuselage crown portion, a tail portion, an aft center wing portion, a supersonic forward fuselage portion, a supersonic lower aft fuselage portion, and a supersonic upper aft fuselage portion, or a combination thereof.

19. A method for operating a hybrid fuel airplane comprising an airplane body, the method comprising:
transferring a cryogenic fuel to an airplane propulsor from an airplane fuel system comprising:
at least one cryogenic fuel tank including (i) a first portion located behind an aft pressure bulkhead of the airplane body, forward of an aft tailcone, and below a vertical tail portion of the airplane body, and (ii) a second portion located in the vertical tail portion of the airplane body behind the aft pressure bulkhead, wherein the first portion of the at least one cryogenic fuel tank and the second portion of the at least one cryogenic fuel tank comprise different portions of a single cryogenic fuel tank, wherein the entirety of the at least one cryogenic fuel tank is located behind the aft pressure bulkhead of the airplane body, and wherein the at least one cryogenic fuel tank is in direct fluid communication with the airplane propulsor,
utilizing a cooling system of the at least one cryogenic fuel tank to maintain the cryogenic fuel contained therein at a sufficiently low temperature, and
a jet fuel tank operable to carry jet fuel and located in an airplane wing, or the airplane body, or both; and
operating the airplane propulsor using the cryogenic fuel to generate thrust for the hybrid fuel airplane.

* * * * *